US012746572B2

(12) United States Patent
Zong et al.

(10) Patent No.: US 12,746,572 B2
(45) Date of Patent: Sep. 29, 2026

(54) TRANSPARENT WEAR-RESISTANT FILM LAYER, PLASTIC SURFACE MODIFICATION METHOD, AND PRODUCT

(71) Applicant: JIANGSU FAVORED NANOTECHNOLOGY CO., LTD., Wuxi (CN)

(72) Inventors: Jian Zong, Wuxi (CN); Fuxing Li, Wuxi (CN); Siyue Li, Wuxi (CN)

(73) Assignee: JIANGSU FAVORED NANOTECHNOLOGY CO., LTD., Wuxi (CN)

( * ) Notice: Subject to any disclaimer, the term of this patent is extended or adjusted under 35 U.S.C. 154(b) by 173 days.

(21) Appl. No.: 18/014,742

(22) PCT Filed: May 30, 2021

(86) PCT No.: PCT/CN2021/097064

§ 371 (c)(1),
(2) Date: Jan. 5, 2023

(87) PCT Pub. No.: WO2022/007536

PCT Pub. Date: Jan. 13, 2022

(65) Prior Publication Data

US 2023/0321686 A1 Oct. 12, 2023

(30) Foreign Application Priority Data

Jul. 6, 2020 (CN) ......................... 202010641136.6

(51) Int. Cl.
*B05D 1/00* (2006.01)
*B05D 3/10* (2006.01)
*B05D 3/14* (2006.01)

(52) U.S. Cl.
CPC ............... *B05D 1/62* (2013.01); *B05D 1/005* (2013.01); *B05D 3/104* (2013.01); *B05D 3/142* (2013.01); *B05D 2201/02* (2013.01); *B05D 2350/35* (2013.01); *B05D 2401/33* (2013.01); *B05D 2518/12* (2013.01)

(58) Field of Classification Search
CPC .......... B05D 1/62; B05D 1/005; B05D 3/104; B05D 3/142
See application file for complete search history.

(56) References Cited

U.S. PATENT DOCUMENTS

| | | | | |
|---|---|---|---|---|
| 4,224,378 | A | 9/1980 | Schroeter et al. | |
| 5,494,712 | A * | 2/1996 | Hu | H01J 37/3266 427/574 |
| 5,718,967 | A | 2/1998 | Hu et al. | |
| 8,313,812 | B2 | 11/2012 | Coak et al. | |
| 10,767,789 | B2 * | 9/2020 | Shugrue | F16K 49/002 |
| 2004/0071971 | A1 | 4/2004 | Iacovangelo | |
| 2009/0155535 | A1 * | 6/2009 | Jousseaume | C23C 16/30 216/53 |
| 2010/0323127 | A1 | 12/2010 | Rhoton et al. | |
| 2015/0240363 | A1 | 8/2015 | Han et al. | |
| 2017/0107345 | A1 | 4/2017 | Kon et al. | |
| 2018/0182870 | A1 * | 6/2018 | Hosaka | H10D 30/6704 |
| 2020/0030847 | A1 | 1/2020 | Shafaei et al. | |
| 2020/0188953 | A1 * | 6/2020 | Zong | B05D 1/60 |

FOREIGN PATENT DOCUMENTS

| | | | | |
|---|---|---|---|---|
| CN | 1199410 | | | 11/1998 |
| CN | 1436036 | | | 8/2003 |
| CN | 1694807 | | | 11/2005 |
| CN | 101153380 | | | 4/2008 |
| CN | 101153380 | A | * | 4/2008 |
| CN | 101370859 | | | 2/2009 |
| CN | 101772588 | | | 7/2010 |
| CN | 109166898 | | | 1/2019 |
| CN | 109923239 | | | 6/2019 |
| CN | 110747447 | | | 2/2020 |
| CN | 110904430 | | | 3/2020 |
| EP | 0 469 926 | A1 | | 8/1991 |
| EP | 1554114 | B1 | | 6/2008 |
| JP | 2000017457 | A | | 1/2000 |
| JP | 2006502026 | A | | 1/2006 |
| JP | 2010058111 | A | | 3/2010 |
| JP | 2017088811 | A | | 5/2017 |
| KR | 20010094136 | | | 10/2001 |

OTHER PUBLICATIONS

Lutz Rosche et al. Silicon Compounds, Organic. 2012. Ullman's Encyclopedia of Industrial Chemistry. vol. 32. 637-673. (Year: 2012).*
Extended European Search Report issued in European Patent Application No. EP21838897.3, dated Jul. 2, 2024.
English translation of an Office Action issued in Japanese Patent Application No. 2023-501235, dated Feb. 19, 2024.
International Search Report and Written Opinion for PCT/CN2021/097064 dated Aug. 6, 2021.

* cited by examiner

*Primary Examiner* — Dah-Wei D. Yuan
*Assistant Examiner* — Kristen A Dagenais
(74) *Attorney, Agent, or Firm* — pH IP Law

(57) ABSTRACT

A transparent wear-resistant film layer, a plastic substrate modification method, and a product, the plastic substrate modification method comprises the following steps: bombarding with ions at least one plastic substrate positioned in one chamber of a PECVD coating device in order to clean and activate the plastic substrate, and on the surface of the activated plastic substrate, using a siloxane monomer as a reaction material and using plasma-enhanced chemical vapor deposition to form a transparent wear-resistant film layer.

8 Claims, No Drawings

TRANSPARENT WEAR-RESISTANT FILM LAYER, PLASTIC SURFACE MODIFICATION METHOD, AND PRODUCT

TECHNICAL FIELD

The present disclosure relates to the field of surface modification of plastic materials, and more particularly, to a transparent wear-resistant film layer, a plastic surface modification method and a product.

BACKGROUND

Plastic is a very common material in daily life, and transparent plastic is one of them. Compared with ordinary plastics, transparent plastic may be used as optical materials. At present, there are hundreds of kinds of transparent plastics, some of which are widely used such as polymethyl methacrylate (PMMA), polycarbonate (PC), polystyrene (PS), etc. These transparent plastics have excellent qualities like low density, easy processing and molding, good impact resistance, foldability, etc. Therefore, in the field of display materials, original glass substrates are being replaced by transparent plastics, especially in the field of portable and wearable electronic displays.

However, transparent plastics have their own shortcomings, such as poor solvent resistance, poor weather resistance, low hardness, and are particularly prone to scratches caused by friction, so transparent plastics is restricted in application of the display field, especially in touch screens.

There are mainly two methods to improve the hardness of plastic. One method is to modify the plastic itself, such as adding hard additives in the plastic to enhance a hardness of the whole plastic. The other method is to form a film on a surface of the plastic to enhance a hardness of the surface of the plastic. The application fields of the two methods are different. The former method needs to be conducted in a plastic manufacturing process, so it is impossible to modify the finished plastic products. The advantage of the latter method is that it can modify the finished plastic products.

Generally, a surface of a transparent plastic could be modified to enhance the hardness of plastic. Solution method is a common method including: firstly, precoating a layer of organic monomer on the surface of the plastic, and then forming a hard film by thermal curing or UV curing. This process is complicated, and the industrial production process is relatively complicated. It is difficult to control the product quality in industrial production, and it is easy to cause waste of raw materials and environmental pollution.

Chinese patent application publication No. CN110760256A discloses that a solution is formed by mixing various acrylic esters, fluorine containing monomers, nano diamond particles and organic solvents with ultrasonic stirring, then a layer of coating is formed on the surface of a PC material by spraying technology, the PC material is placed in an oven for drying, and finally curing treatment is conducted by a UV of 1000 $mJ/cm^2$. The whole process is complex. For industrial production, it needs to be equipped with a variety of processes. The production cost is high, and the quality is difficult to control. At the same time, the solution spraying method may inevitably lead to environmental pollution and personnel health problems.

SUMMARY

According to a transparent wear-resistant film layer, a plastic surface modification method and a product provided by the present disclosure, the present disclosure has an advantage that a plastic could be hardened by the plastic surface modification method to make the plastic material wear-resistant. At the same time, the transparent wear-resistant film layer formed by the plastic surface modification method does not have too much impact on a light transmittance performance of the plastic material itself.

According to a transparent wear-resistant film layer, a plastic surface modification method and a product provided by the present disclosure, the present disclosure has an advantage that a preparation process of the transparent wear-resistant film layer conducted by the plastic surface modification method does not require a large amount of organic solvent, and the whole preparation process is clean and pollution-free.

According to a transparent wear-resistant film layer, a plastic surface modification method and a product provided by the present disclosure, the present disclosure has an advantage that the monomer introduced in a preparation process of the transparent wear-resistant film layer conducted by the plastic surface modification method could be controllable in amount, which is conducive to a stability of the coating quality.

According to a transparent wear-resistant film layer, a plastic surface modification method and a product provided by the present disclosure, the present disclosure has an advantage that the film layer deposition conducted by the plastic surface modification method could be controlled on a nano scale to facilitate the preparation of the transparent wear-resistant film layer in a field of high precision requirements, such as the field of precision electronic equipment.

According to a transparent wear-resistant film layer, a plastic surface modification method and a product provided by the present disclosure, the present disclosure has an advantage that in the plastic surface modification method, plasma are used to clean and activate the plastic substrate to help improve the surface energy of the plastic substrate, thereby improving a binding strength between the transparent wear-resistant film layer and the surface of the plastic substrate, thereby enhancing a stability and wear-resistant life of the transparent wear-resistant film layer.

According to a transparent wear-resistant film layer, a plastic surface modification method and a product provided by the present disclosure, the present disclosure has an advantage that in the plastic surface modification method, the plastic substrate could be placed at a low temperature to reduce a possibility of damage to some precision components due to a high temperature, and the application scope of the plastic surface modification method could be expanded.

According to an aspect of the present disclosure, a plastic surface modification method is provided. The plastic surface modification method includes a step of: introducing a siloxane monomer serving as a reaction raw material into a chamber of a PECVD coating device to form a transparent wear-resistant film layer on at least one surface of a plastic substrate by a plasma enhanced chemical vapor deposition.

According to an embodiment of the present disclosure, the method further includes a step of: bombarding the plastic substrate with plasma to activate the plastic substrate before the step to form the transparent wear-resistant film layer.

According to an embodiment of the present disclosure, during the step to form the transparent wear-resistant film layer, the siloxane monomer is introduced with an auxiliary gas which includes one or more selected from a group consisting of an inert gas and an oxygen.

According to an embodiment of the present disclosure, during the step of bombarding, an activation gas is introduced and the plasma discharge is turned on, wherein the activation gas includes one selected from a group consisting of an oxygen and a hydrogen.

According to an embodiment of the present disclosure, during the step of bombarding, before the activation gas is introduced, an inert gas is introduced and the plasma discharge is turned on, wherein the inert gas includes one or more selected from a group consisting of He, Ar and Kr.

According to an embodiment of the present disclosure, during the step to form the transparent wear-resistant film layer, the siloxane monomer, an inert gas and an oxygen are introduced as reaction raw materials.

According to an embodiment of the present disclosure, during the step to form the transparent wear-resistant film layer, the siloxane monomer and an oxygen are introduced as reaction raw materials.

According to an embodiment of the present disclosure, the PECVD coating device takes an ICP source as a plasma source.

According to an embodiment of the present disclosure, a bias voltage is applied to the chamber of the PECVD coating device.

According to an embodiment of the present disclosure, the plastic substrate placed on a rotary frame so as to be movable during a coating process.

According to an embodiment of the present disclosure, before the plasma bombardment, the plastic substrate is cleaned with a cleaning agent.

According to an embodiment of the present disclosure, the plasma bombardment includes:

pumping to get a vacuum degree in the chamber being not greater than $1\times10^{-1}$ Pa;

introducing an inert gas, applying a bias voltage ranging from 10V to 1000V in the chamber, controlling an ICP source power to range from 50 W to 1000 W and controlling a vacuum degree to range from 0.1 Pa to 50 Pa to conduct a plasma bombardment activation; and introducing an activation gas, applying a bias voltage ranging from 10V to 1000V in the chamber, controlling an ICP source power to range from 100 W to 1000 W and controlling a vacuum degree to range from 0.1 Pa to 50 Pa to conduct a plasma bombardment activation.

According to an embodiment of the present disclosure, the step to form the transparent wear-resistant film layer includes:

introducing a vapor of the siloxane monomer, applying a bias voltage ranging from 100V to 1000V in the chamber, controlling an ICP source power to range from 100 W to 1000 W and controlling a vacuum degree to range from 0.5 Pa to 80 Pa for deposition and coating.

According to an embodiment of the present disclosure, the vapor of the siloxane monomer is introduced into the chamber through a vacuum liquid phase evaporation device, and a liquid of the siloxane monomer is introduced into an evaporation chamber of the vacuum liquid phase evaporation device through a diaphragm valve with quantitative control, and then is evaporated into vapor and introduced into the chamber.

According to an embodiment of the present disclosure, the siloxane includes one or more selected from a group consisting of: octamethylcyclotetrasiloxane, hexamethylcyclotrisiloxane, tetramethylcyclotetrasiloxane, trimethylcyclotrisiloxane, tetramethyltetravinylcyclotetrasiloxane, dodecylcyclohexasiloxane, decamethylcyclopentasiloxane, dimethylsiloxane, tetraethoxysilane, tetramethoxysilane, hexamethyldisiloxane, tetramethyldisiloxane, hexaethyldisiloxane, and hexaethyldisiloxane.

According to an embodiment of the present disclosure, the plastic substrate includes one or more selected from a group of: a substrate made of plastics and a substrate having a surface made of plastics.

According to another aspect of the present disclosure, a product with a transparent wear-resistant film layer is provided. At least one surface of the product is provided with a transparent wear-resistant film layer, the at least one surface of the product is made of plastic material, and the transparent wear-resistant film layer is formed on the at least one surface of the product by a plasma enhanced chemical vapor deposition using a siloxane monomer as a reaction raw material.

According to an embodiment of the present disclosure, the product includes one or more selected from a group consisting of: plastic products, printed circuit boards, electronic products, electronic assembly semi-finished products, and electrical components.

DETAILED DESCRIPTION

The following description serves to disclose the disclosure to enable those skilled in the art to practice the present disclosure. The preferred embodiments in the following description are only examples. Those skilled in the art may think of other obvious variations. The basic principles of the present disclosure as defined in the following description may be applied to other embodiments, variations, modifications, equivalents, and other technical solutions without departing from the spirit and scope of the present disclosure.

Those skilled in the art will appreciate that the term "a", "an", or "one" is to be understood as "at least one" or "one or more", i.e., in one embodiment, the number of one element may be one and in another embodiment the number of one element may be multiple, and that the term "a", "an", or "one" is not to be construed to limit the number.

According to a transparent wear-resistant film layer, a plastic surface modification method and a product provided by the present disclosure, the transparent wear-resistant film layer may contain Si, O or contain Si, O and H.

The transparent wear-resistant film layer has a good scratch resistance performance and a good light transmittance performance. When the transparent wear-resistant film layer is attached to a surface of a substrate, especially a surface of a plastic substrate, the transparent wear-resistant film layer enables the substrate to have a good wear-resistant performance and a good light transmittance performance. When the substrate is a plastic substrate, especially a transparent plastic substrate, the transparent wear-resistant film layer does not cause an excessive influence on light transmittance of the plastic substrate itself. That is to say, after the transparent wear-resistant film layer is formed on the transparent plastic substrate, the original light transmittance performance or a light transmittance performance similar with the original light transmittance performance could be maintained.

Because of these characteristics of the transparent wear-resistant film layer, an application scope of the transparent wear-resistant film layer could be expanded.

The present disclosure provides a product with the transparent wear-resistant film layer. It should be understood that the product includes the plastic substrate. The plastic substrate includes a substrate entirely made of plastic, or a substrate having a surface made of plastic and an interior not made of plastic.

According to some embodiments of the present disclosure, the product includes one or more selected from a group consisting of: plastic products, printed circuit boards, electronic products, electronic assembly semi-finished products, and electrical components. When the product is an electronic device with a plastic surface, examples of the product may be but is not limited to a mobile phone, a tablet, a keyboard, an e-reader, a wearable, a display, a headphone, a PSP and other devices. When the product is an electrical component, the electrical component may be a resistor, capacitor, transistor, diode, amplifier, relay, transformer, battery, fuse, integrated circuit, switch, LED, LED display, piezoelectric element, optoelectronic component, antenna or oscillator. Of course, it should be understood by those skilled in the art that the aforementioned description is illustrative and does not imply a limitation on the present disclosure.

The product with the transparent wear-resistant film layer has no scratches after thousands of times of friction through a dust-free cloth wiping test. According to the product with the transparent wear-resistant film layer, a color of the plastic substrate itself could be observed through the transparent wear-resistant film layer within a certain range of a thickness.

According to the plastic surface modification method of the present disclosure, a transparent wear-resistant film is formed on a surface of a plastic substrate by a plasma enhanced chemical vapor deposition (PECVD) process. That is, in a preparation process, the plastic substrate is exposed in a chamber of a plasma enhanced chemical vapor deposition coating device, plasmas are formed in the chamber, and the reaction raw materials could form the transparent wear-resistant film layer on the surface of the plastic substrate by chemical deposition reaction.

The plasma enhanced chemical vapor deposition (PECVD) process has many advantages over other existing deposition processes: (1) it is a dry deposition to form a uniform film layer without pinholes; (2) the plasma polymerized film has stable chemical and physical properties, such as solvent resistance, chemical corrosion resistance, heat resistance, wear resistance, etc: (3) the plasma polymerized film has a good binding force with substrates; (4) a homogeneous film could also be formed on the surface of extremely irregular substrate; (5) The film could be prepared at a low temperature such as a room temperature to effectively avoid damage to temperature sensitive devices; (6) The plasma process could not only prepare films with a thickness in micrometers, but also prepare ultra-thin nanoscale films.

According to the plastic surface modification method provided by the present disclosure, the plastic surface modification method includes steps of:

(1) Cleaning the Plastic Substrate the plastic substrate is placed in the cleaning agent for cleaning to remove oil stains on the surface.

(2) Surface Activation of the Plastic Substrate

In an environment of inert gas: placing the cleaned and dried plastic substrate in a chamber of a PECVD coating device, vacuumizing, then introducing inert gas, and turning on a discharge in the chamber under a certain vacuum degree and a certain voltage to conduct a plasma bombardment activation; and in an environment of activation gas: introducing the activation gas and turning on a discharge in the chamber under a certain vacuum degree and a certain voltage to conduct a plasma bombardment activation.

(3) Forming the Transparent Wear-Resistant Film Layer

The transparent wear-resistant film layer is formed on the surface of the plastic substrate by introducing a siloxane monomer, an inert gas and an activation gas under a certain vacuum degree and a certain voltage.

According to an embodiment of the present disclosure, during a process of cleaning the plastic substrate, a cleaning agent may be an organic solvent, such as ethanol or isopropanol. The cleaning agent may also be deionized water. Oil stains on the surface of the plastic substrate could be removed with an assistance of ultrasound.

It should be understood that if the plastic substrate is at risk of being damaged by ultrasound, it could be cleaned with an organic solvent first, and then could be cleaned and activated by plasmas in an activation process of the plastic substrate.

According to an embodiment of the present disclosure, during a process of cleaning the plastic substrate, the plastic substrate is respectively placed in deionized water and industrial high-purity ethanol or isopropanol for ultrasonic cleaning for 10-20 minutes to remove impurities on the surface of the plastic substrate.

According to an embodiment of the present disclosure, the plastic surface modification could be conducted at a relatively low temperature, such as a temperature ranging from 20° C. to 30° C.

According to an embodiment of the present disclosure, during an activation process of the plastic substrate, the inert gas includes one or more selected from a group consisting of He, Ar and Kr.

According to an embodiment of the present disclosure, during an activation process of the plastic substrate, after the inert gas is introduced, a vacuum degree of a chamber in the PECVD coating device is controllable within a range from 0.1 Pa to 50 Pa, and further, for example, controlled to range from 0.5 Pa to 5 Pa. After the activation gas being introduced, a vacuum degree of the chamber in the PECVD coating device is controlled to range from 0.1 Pa to 50 Pa, and further, for example, controlled to range from 0.1 Pa to 1 Pa.

The plastic substrate could be fixedly placed at a preset position of the chamber, and the plastic substrate could also be movably placed at a preset position in the chamber.

According to an embodiment of the present disclosure, the PECVD coating device provides a carrier frame placed in the chamber, and the carrier frame may be a rotary frame. The plastic substrate is placed on the rotary frame. When the rotary frame moves relative to the chamber around an axis, the plastic substrate could move relative to the chamber. In this way, the plastic substrate could fully contact with plasmas in the chamber to facilitate the uniformity of coating.

According to an embodiment of the present disclosure, in a plasma enhanced chemical vapor deposition (PECVD) process, plasmas are generated by a glow discharge, and a discharge method could be but is not limited to a microwave discharge, a radio frequency discharge, an ultraviolet discharge, an electric spark discharge, and the like.

According to an embodiment of the present disclosure, the PECVD coating device provides one or more energy sources, which could convert one or more gases into plasmas. The plasmas may include ionized and neutral introduced gases/precursors, ions, electrons, atoms, free radicals and/or other neutral substances produced by plasmas.

The energy sources may include an ICP (inductively coupled plasma) plasma excitation source or a bias power supply. The carrier frame could be made of conductive materials, and the bias power supply could be conductively coupled with the carrier frame to discharge at the position of the carrier frame. The ICP plasma excitation source could be configured outside the chamber. It should be understood that the configuration position of the energy source described here is just an example. The energy source could also be configured on the inner wall of the chamber or other positions.

According to an embodiment of the present disclosure, during an activation process of the plastic substrate, after the inert gas is introduced, a voltage of a bias power supply could be controlled to range from 10V to 1000V, and a power of the ICP could be controlled to range from 50 W to 1000 W. During a process of cleaning and activating the plastic substrate, after the activation gas being introduced, a voltage of the bias power supply could be controlled to range from 10V to 1000V, and a power of the ICP could be controlled to range from 100 W to 1000 W.

According to an embodiment of the present disclosure, a radio frequency power supply could be used as the power supply of the ICP to generate an alternating magnetic field through an inductive coupling of a coil, thereby resulting in a gas ionization. A rapidly changing magnetic field is conducive to a full and uniform ionization. The bias power supply could be a pulse bias power supply, which ionizes the gas through a glow discharge, and has a directional traction acceleration effect on positive ions. In a process of forming the transparent wear-resistant film layer, a dense and high hardness transparent wear-resistant film layer could be formed due to a bombardment effect.

The ICP and the bias power supply could be used at the same time. On a basis of obtaining high-level ionized plasmas, the energy of the plasmas reaching the surface of the plastic substrate could be increased, which is conducive to obtaining a dense transparent wear-resistant film layer.

The ICP and the bias power supply could be used at the same time to improve a deposition efficiency. The transparent wear-resistant film layer could be effectively deposited on the surface of the plastic substrate, and a preparation duration time could be shortened. This is very beneficial to an industrial production of the transparent wear-resistant film layer, and to improve its production efficiency.

According to an embodiment of the present disclosure, during a process of cleaning and activating the plastic substrate, a flow rate of the inert gas and the activation gas could be controlled to range from 10 sccm to 1000 sccm respectively.

According to an embodiment of the present disclosure, the activation gas could be an oxygen, a hydrogen or a mixture of an oxygen and a hydrogen. In a process of cleaning and activating the plastic substrate, under the action of the energy source, plasma bombardment could be generated to effectively remove pollutants attached to the surface of the plastic substrate, such as oil stains. It should be noted that when the activation gas is an oxygen, oxygen ions could form dangling bonds on the surface of the plastic substrate, which is conducive to enhancing a bonding strength between the transparent wear-resistant film layer formed subsequently and the plastic substrate.

According to an embodiment of the present disclosure, the siloxane monomer may be a chain siloxane compound or a cyclic siloxane compound.

According to an embodiment of the present disclosure, the siloxane monomer has a following structure:

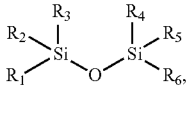

wherein, each of $R_1$ to $R_6$ is independently selected from $C_1$-$C_6$ alkyl, $C_2$-$C_6$ alkenyl or hydrogen, and at least one of $R_1$ to $R_6$ is not hydrogen. Optionally, each of $R_1$ to $R_6$ is independently selected from $C_1$-$C_3$ alkyl, $C_2$-$C_4$ alkenyl or hydrogen, such as methyl, ethyl, vinyl, allyl, or hydrogen, and at least one of $R_1$ to $R_6$ is not hydrogen. Optionally, at least two or three (for example, four, five, or six) of $R_1$ to $R_6$ are not hydrogen. Optional examples of the siloxane monomer may include hexamethyldisiloxane (HMDSO), hexaethyldisiloxane, tetramethyldisiloxane (TMDSO), 1,3-diethyltetramethyldisiloxane (DVTMDSO), and hexavinyldisiloxane (HVDSO).

According to an embodiment of the present disclosure, the siloxane monomer has a following structure:

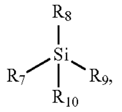

wherein, each of $R_7$ to $R_{10}$ is independently selected from $C_1$-$C_6$ alkyl, $C_1$-$C_6$ alkoxy, $C_2$-$C_6$ alkenyl and hydrogen, at least one of $R_7$ to $R_{10}$ is not hydrogen and at least one of $R_7$ to $R_{10}$ has oxygen to form a silicon-oxygen bond. Optionally, each of $R_7$ to $R_{10}$ is independently selected from $C_1$-$C_3$ alkyl, $C_1$-$C_3$ alkoxy, $C_2$-$C_4$ alkenyl and hydrogen, and at least one of $R_7$ to $R_{10}$ is not hydrogen. Optionally, at least two of $R_7$ to $R_{10}$ are not hydrogen, for example, three or four of $R_7$ to $R_{10}$ are not hydrogen. Optional examples of the siloxane monomer may include allyl trimethoxysilane (ATMOS), tetraethyl orthosilicate (TEOS), 3-(diethylamino) propyl trimethoxysilane, trimethylsiloxane, triisopropylsiloxane, tetramethoxysilane, and dimethylsiloxane.

According to an embodiment of the present disclosure, the siloxane monomer has a following structure:

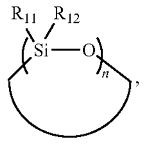

wherein, n is 3 or 4, each of $R_{11}$ and $R_{12}$ is independently selected from $C_1$-$C_6$alkyl, $C_2$-$C_6$ alkenyl and hydrogen, and at least one of $R_{11}$ and $R_{12}$ is not hydrogen. Optionally, each of $R_{11}$ and $R_{12}$ is independently selected from $C_1$-$C_3$ alkyl, $C_2$-$C_4$ alkenyl or hydrogen, such as methyl, ethyl, vinyl, allyl, or hydrogen, and at least one of $R_{11}$ and $R_{12}$ is not hydrogen. Optional examples of the siloxane monomer may include triethyltrimethylcyclotrisiloxane ($V_3D_3$), tetraethyltetramethylcyclotetrasiloxane ($V_4D_4$), tetramethylcyclotetrasiloxane (TMCS) and octamethylcyclotetrasiloxane (OMCTS), hexamethylcyclotrisiloxane, trimethylcyclotrisiloxane, dodecylcyclohexasiloxane, and decamethylcyclopentasiloxane.

According to an embodiment of the present disclosure, the siloxane includes one or more selected from a group consisting of: octamethylcyclotetrasiloxane, hexamethylcyclotrisiloxane, tetramethylcyclotetrasiloxane, trimethylcyclotrisiloxane, tetramethyltetravinylcyclotetrasiloxane, dodecylcyclohexasiloxane, decamethylcyclopentasiloxane, dimethylsiloxane, tetraethoxysilane, tetramethoxysilane, hexamethyldisiloxane, tetramethyldisiloxane, hexaethyldisiloxane, and hexaethyldisiloxane.

According to an embodiment of the present disclosure, the siloxane monomer is introduced through a vacuum liquid phase evaporation device. The siloxane monomer could be controlled in quantity and vaporized to form a vapor at a relatively low temperature to enter the chamber of the PECVD coating device. The vacuum liquid phase evaporation device could be provided with a diaphragm valve to control the siloxane monomer in quantity. Since the introducing amount of the siloxane monomer could be precisely controlled, it is beneficial to enhance the deposition stability of the transparent wear-resistant film layer during the preparation process, as well as to improve a utilization rate of the siloxane monomer.

It should be noted that the PECVD coating device is equipped with an exhaust gas filter device, and exhaust gases generated after the reaction could be filtered through the exhaust gas filter device to reduce the pollution to the external environment.

It should be noted that the plastic substrate needs to be transmitted between the process of cleaning the plastic substrate (1) and the process of surface activation of the plastic substrate (2), and no other special transmitting is needed between other processes in the entire preparation process. The industrialization variables could be reduced, which is conducive to a quantity production of the transparent wear-resistant film layer.

Embodiment One

1) A PC sheet was placed respectively in deionized water, and industrial high-purity ethanol or isopropanol for ultrasonic cleaning for 10 minutes to remove oil stains on the surface.
2) The PC sheet cleaned as above was dried and loaded into a chamber of a PECVD coating device, and the chamber was pumped to get a vacuum degree being less than $1\times10^{-2}$ Pa. An inert gas (Ar or He) was introduced at a flow rate of 100 sccm. The vacuum degree was maintained at 0.5 Pa, a bias voltage of 500V was applied on a rotary frame, an ICP power was set to 300 W, and a plasma bombardment activation was conducted for 10 minutes. Then $O_2$ was introduced at a flow rate of 100 sccm, the vacuum degree was maintained at 0.5 Pa, a bias voltage of 200V was applied on a rotary frame, an ICP power was set to 500 W, and a plasma bombardment activation was conducted for 10 minutes to increase the surface activity.
3) A vapor of hexamethyldisiloxane monomer was introduced at a flow rate of 300 μL/min, at the same time, He and 02 were introduced at a flow rate of 100 sccm and at a flow rate of 300 sccm respectively. A butterfly valve was adjusted to keep a vacuum degree at 16 Pa, a bias voltage of 300V was applied on the rotary frame, an ICP power was set at 800 W, and the coating duration time was 1800 s.

A thickness of the film layer prepared in Embodiment One was 280 nm, and a transmittance of PC material increased by 0.5% (94% before coating, 94.5% after coating). There were no scratches after rubs with a dust-free cloth for 10,000 times (500 g, 30 r/min, 3 cm stroke, the friction equipment was a XM-860 friction tester of Shenzhen Xiangmin Instrument&Equipment Co., Ltd.).

Embodiment Two

1) A PC sheet was placed respectively in deionized water, and industrial high-purity ethanol or isopropanol for ultrasonic cleaning for 10 minutes to remove oil stains on the surface.
2) The PC sheet cleaned as above was dried and loaded into a chamber of a PECVD coating device, and the chamber was pumped to get a vacuum degree being less than $1\times10^{-2}$ Pa. An inert gas Ar was introduced at a flow rate of 100 sccm. The vacuum degree was maintained at 0.5 Pa, a bias voltage of 500V was applied on a rotary frame, an ICP power was set to 300 W, and a plasma bombardment activation was conducted for 10 minutes. Then $H_2$ was introduced at a flow rate of 100 sccm, the vacuum degree was maintained at 0.5 Pa, a bias voltage of 200V was applied on a rotary frame, an ICP power was set to 500 W, and a plasma bombardment activation was conducted for 10 minutes to increase the surface activity.
3) A vapor of tetraethoxysilane (TEOS) monomer was introduced at a flow rate of 500 μL/min, at the same time, $O_2$ was introduced at a flow rate of 300 sccm. A butterfly valve was adjusted to keep a vacuum degree at 15 Pa, a bias voltage of 600V was applied on the rotary frame, an ICP power was set at 500 W, and the coating duration time was 1800 s.

A thickness of the film layer prepared in Embodiment Two was 235 nm, and there were no scratches after rubs with a dust-free cloth for 10,000 times.

Embodiment Three

1) A PC sheet was respectively placed in deionized water, and industrial high-purity ethanol or isopropanol for ultrasonic cleaning for 10 minutes to remove oil stains on the surface.
2) The PC sheet as cleaned above was dried and loaded into a chamber of a PECVD coating device, and the chamber was pumped to get a vacuum degree being less than $1\times10^{-2}$ Pa. An inert gas (Ar or He) was introduced at a flow rate of 100 sccm. The vacuum degree was maintained at 0.5 Pa, a bias voltage of 500V was applied on a rotary frame, an ICP power was set to 300 W, and a plasma bombardment activation was conducted for 10 minutes. Then 02 was introduced at a flow rate of 100 sccm, the vacuum degree was maintained at 0.5 Pa, a bias voltage of 200V was applied on the rotary frame, an ICP power was set to 500 W, and a plasma bombardment activation was conducted for 10 minutes to increase the surface activity.
3) A vapor of tetramethoxysilane (TMOS) monomer was introduced at a flow rate of 550 μL/min, at the same time, Ar and 02 were introduced at a flow rate of 100 sccm and at a flow rate of 300 sccm respectively. A butterfly valve was adjusted to keep a vacuum degree at 16 Pa, a bias voltage of 400V was applied on the rotary frame, an ICP power was set at 500 W, and the coating duration time was 1800 s.

A thickness of the film layer prepared in Embodiment Three was 320 nm, and there were no scratches after rubs with a dust-free cloth for 10,000 times.

Embodiment Four

1) A PC sheet was respectively placed in deionized water, and industrial high-purity ethanol or isopropanol for ultrasonic cleaning for 10 minutes to remove oil stains on the surface.

2) The PC sheet as cleaned above was dried and loaded into a chamber of a PECVD coating device, and the chamber was pumped to get a vacuum degree being less than $1\times10^{-2}$ Pa. Ar was introduced at a flow rate of 100 sccm. The vacuum degree was maintained at 0.5 Pa, a bias voltage of 500V was applied on a rotary frame, an ICP power was set to 300 W, and a plasma bombardment activation was conducted for 10 minutes. Then an activation gas ($O_2$ or $H_2$) was introduced at a flow rate of 100 sccm, the vacuum degree was maintained at 0.5 Pa, a bias voltage of 200V was applied on the rotary frame, an ICP power was set to 500 W, and a plasma bombardment activation was conducted for 10 minutes to increase the surface activity.

3) A vapor of tetramethyltetrasiloxane monomer was introduced at a flow rate of 600 μL/min, at the same time, Ar and $O_2$ were introduced at a flow rate of 100 sccm and at a flow rate of 300 sccm respectively. A butterfly valve was adjusted to keep a vacuum degree at 12 Pa, a bias voltage of 500V was applied on the rotary frame, an ICP power was set at 600 W, and the coating duration time was 1800 s.

A thickness of the film layer prepared in Embodiment Four was 350 nm, and there were no scratches after rubs with a dust-free cloth for 10,000 times.

Those skilled in the art will appreciate that, the embodiments of the present disclosure shown in the foregoing description are by way of example only and are not intended to limit the present disclosure. The object of the present disclosure has been completely and effectively realized. The functionality and structural principles of the present disclosure have been shown and illustrated in the embodiments, and the embodiments of the disclosure may be varied or modified without departing from the principles described herein.

The invention claimed is:

1. A polycarbonate plastic surface modification method, comprising a step of:

introducing a siloxane monomer serving as a reaction raw material into a chamber of a Plasma Enhanced Chemical Vapor Deposition (PECVD) coating device to form a transparent wear-resistant film layer on at least one surface of a polycarbonate plastic substrate by a plasma enhanced chemical vapor deposition;

wherein the step to form the transparent wear-resistant film layer comprises: introducing a vapor of the siloxane monomer, applying a bias voltage ranging from 300V to 400V in the chamber, controlling an Inductively Coupled Plasma (ICP) source power to range from 500W to 800 W and controlling a vacuum degree to range from 0.5 Pa to 16 Pa for deposition and coating;

wherein the polycarbonate plastic surface modification method further comprises: bombarding the polycarbonate plastic substrate with plasma to activate the polycarbonate plastic substrate before the step to form the transparent wear-resistant film layer;

wherein during the step of bombarding, an activation gas is introduced and a plasma discharge is turned on, a bias voltage ranging from 10V to 1000V is applied in the chamber, an Inductively Coupled Plasma (ICP) source power is controlled to range from 100 W to 1000 W, a vacuum degree is controlled to range from 0.5 Pa to 5 Pa for a plasma bombardment activation by the activation gas, and the activation gas is an oxygen; and wherein during the step of bombarding, before the activation gas is introduced, an inert gas is introduced and a plasma discharge is turned on, a bias voltage ranging from 10V to 1000V is applied in the chamber, an ICP source power is controlled to range from 50 W to 1000 W, and a vacuum degree is controlled to range from 0.1 Pa to 1 Pa for a plasma bombardment activation by the inert gas, wherein the inert gas comprises one or more selected from a group consisting of He, Ar and Kr;

wherein the siloxane monomer has one of following structures:

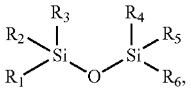

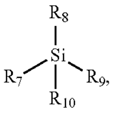

wherein each of $R_1$ to $R_6$ is independently selected from $C_1$-$C_6$ alkyl; and each of $R_7$ to $R_{10}$ is independently selected from $C_1$-$C_6$ alkoxy; and wherein after the transparent wear-resistant film layer is formed on the transparent polycarbonate plastic substrate, a light transmittance is increased or maintained at the original level of the transparent polycarbonate plastic substrate, and there are no scratches after rubs on the transparent wear-resistant film layer formed on the transparent polycarbonate plastic substrate with a dust-free cloth for 10,000 times.

2. The method according to claim 1, wherein, during the step to form the transparent wear-resistant film layer, the siloxane monomer is introduced with an auxiliary gas comprising one or more selected from a group consisting of an inert gas and an oxygen.

3. The method according to claim 1, wherein, during the step to form the transparent wear-resistant film layer, the siloxane monomer, an inert gas and an oxygen are introduced as reaction raw materials, or the siloxane monomer and an oxygen are introduced as reaction raw materials.

4. The method according to claim 1, wherein the polycarbonate plastic substrate is placed on a rotary frame so as to be movable during a coating process.

5. The method according to claim 1, wherein before the step of bombarding, the polycarbonate plastic substrate is cleaned with a cleaning agent.

6. The method according to claim 1, wherein the vapor of the siloxane monomer is introduced into the chamber through a vacuum liquid phase evaporation device, and a liquid of the siloxane monomer is introduced into an evaporation chamber of the vacuum liquid phase evaporation device through a diaphragm valve with quantitative control, and then is evaporated into vapor and introduced into the chamber.

7. The method according to claim 1, wherein the siloxane monomer comprises one or more selected from a group consisting of: octamethylcyclotetrasiloxane, hexamethylcyclotrisiloxane, tetramethylcyclotetrasiloxane, trimethylcyclotrisiloxane, dodecylcyclohexasiloxane, tetramethyltetravinylcyclotetrasiloxane, decamethylcyclopentasiloxane, dimethylsiloxane, tetraethoxysilane, tetramethoxysilane, hexamethyldisiloxane, tetramethyldisiloxane, hexaethyldisiloxane, and hexaethyldisiloxane.

8. The method according to claim 1, wherein the polycarbonate plastic substrate comprises one or more selected from a group of: a substrate made of polycarbonate and a substrate having a surface made of polycarbonate.

* * * * *